United States Patent [19]
Rudolph

[11] Patent Number: 5,322,266
[45] Date of Patent: Jun. 21, 1994

[54] HYDRAULIC DAMPER ELASTOMERIC BODY HAVING ALTERNATING RIGID AND DEFORMABLE WALL SECTIONS

[75] Inventor: Axel Rudolph, Bensheim, Fed. Rep. of Germany

[73] Assignee: Firma Carl Freudenberg, Weinheim, Fed. Rep. of Germany

[21] Appl. No.: 14,961

[22] Filed: Feb. 8, 1993

[30] Foreign Application Priority Data

Feb. 20, 1992 [DE] Fed. Rep. of Germany ....... 4205123

[51] Int. Cl.$^5$ ............................................. F16F 13/00
[52] U.S. Cl. ............................... 267/140.12; 267/219
[58] Field of Search ................. 267/140.12, 219, 220; 180/300, 312, 902; 248/562, 636

[56] References Cited

U.S. PATENT DOCUMENTS

| | | | |
|---|---|---|---|
| 2,614,896 | 10/1952 | Pierce, Jr. | 308/26 |
| 3,147,964 | 9/1964 | Wolf | 267/63 |
| 3,698,703 | 10/1972 | Hipsher | 267/63 |
| 4,700,934 | 10/1987 | Andra et al. | 267/140.12 |
| 4,705,410 | 11/1987 | Broock | 267/140.12 X |
| 4,861,004 | 8/1989 | Yokota et al. | 267/140 R |

FOREIGN PATENT DOCUMENTS

| | | | |
|---|---|---|---|
| 0009120 | 4/1980 | European Pat. Off. | |
| 57-94147 | 6/1982 | Japan | 267/140.12 |
| 63-266240 | 11/1988 | Japan | 267/140.12 |
| 2211580 | 7/1989 | United Kingdom | 267/140.12 |

*Primary Examiner*—Robert J. Oberleitner
*Assistant Examiner*—Josie A. Ballato
*Attorney, Agent, or Firm*—Kenyon & Kenyon

[57] ABSTRACT

A sleeve bearing comprising two thrust-bearing parts wherein one thrust-bearing part surrounds the other. The two thrust-bearing parts extend essentially parallel to one axis and are braced against each other by a resilient member made of rubber elastic material. The resilient member defines at least one pair of fluid-filled chambers which are connected by at least one damping opening and are arranged so that they diametrically oppose one another. The chambers are bounded in the axial direction on both sides by end walls, which are elastically deformable in one partial area. Each end wall has a rigid zone which resists deformation. At one end of each fluid chamber, the rigid zone of the end wall extends to the inner thrust-bearing part, and at the other end of each fluid chamber, the rigid zone of the end wall extends to the outer thrust-bearing part.

16 Claims, 1 Drawing Sheet

HYDRAULIC DAMPER ELASTOMERIC BODY HAVING ALTERNATING RIGID AND DEFORMABLE WALL SECTIONS

BACKGROUND OF THE INVENTION

The present invention relates generally to a sleeve bearing comprising two thrust-bearing parts, wherein one thrust-bearing part surrounds the other. The two thrust-bearing parts extend essentially parallel to one axis and are braced against each other by a resilient member made of rubber elastic material. The resilient member defines at least one pair of fluid-filled chambers, wherein the chambers are connected by at least one damping opening and are arranged so that they diametrically oppose one another. The chambers are bounded in the axial direction on both sides by end walls, which are elastically deformable in one partial area.

A sleeve bearing with hydraulic damping is disclosed by the European Patent Office application 0 009 120. It comprises a number of pairs of fluid-filled chambers, wherein the chambers are arranged on mutually opposing sides of a plane through the axis of the bearing and one behind another along the direction of the axis. The chambers are in fluid communication with one another through damping openings, which are independent of one another. In this manner, vibrations which are introduced at right angles to the axis and vibrations which are introduced parallel to the axis are able to be damped effectively. However, manufacturing such a sleeve bearing entails a considerable expenditure.

SUMMARY OF THE INVENTION

The object of the present invention is to further develop such a sleeve bearing while achieving the goal of a simplified production.

This objective is solved according to the invention with a sleeve bearing of the type mentioned at the outset wherein, next to the deformable partial area, each end wall has a rigid zone which resists deformation. At one end of each fluid chamber, the rigid zone of the end wall extends to the inner thrust-bearing part, and at the other end of each fluid chamber, the rigid zone of the end wall extends to the outer thrust-bearing part. This configuration achieves good vibration damping with only one damping opening, both when vibrations are introduced parallel to the axis of the bearing, as well as when they are introduced at right angles to the axis of the bearing. The sleeve bearing can be produced quite simply when the rigid zones are formed integrally with the resilient member and the elastically deformable partial areas.

An advantageous embodiment of the present invention provides at least two chamber pairs, whose chambers are arranged around the circumference of the bearing. This embodiment allows damping of vibrations in a direction parallel to the axis and in two axially normal directions which are perpendicular to one another.

DETAILED DESCRIPTION OF THE INVENTION

Figure 1:
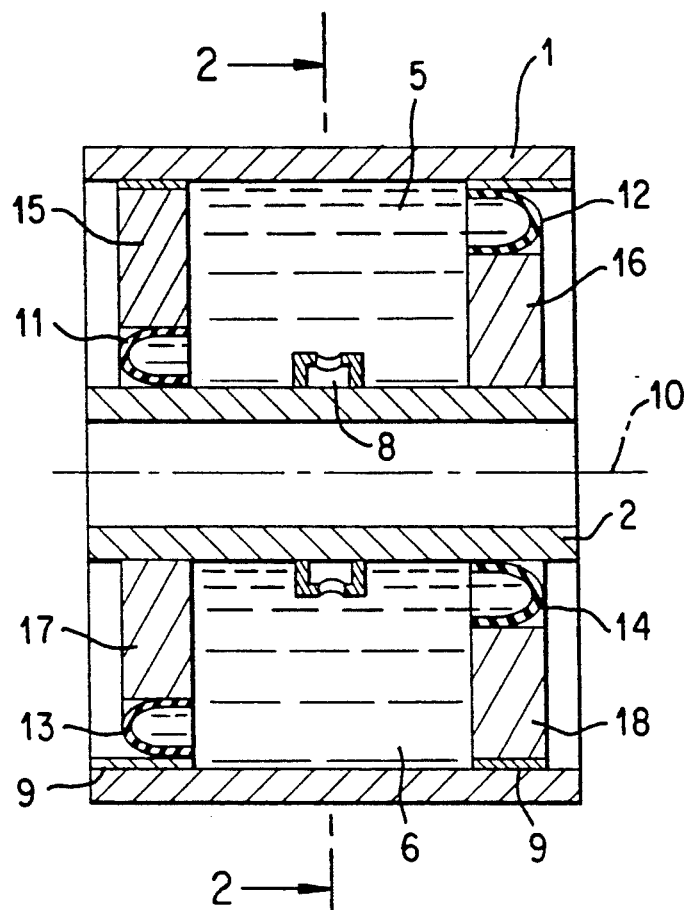
FIG. 1 shows an embodiment of a sleeve bearing according to the invention in longitudinal cross-section.
Figure 2:
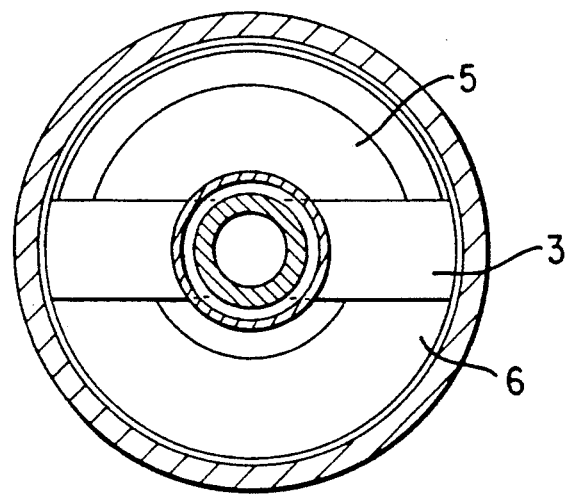
FIG. 2 shows a cross-sectional view of the sleeve bearing according to FIG. 1, taken along the line 2—2 in FIG. 1.

The sleeve bearing shown in FIGS. 1 and 2 comprises an outer thrust-bearing part 1 and an inner thrust-bearing part 2. The outer thrust-bearing part 1 has a tubular design and surrounds the inner thrust-bearing part 2. The two thrust-bearing parts 1, 2 extend essentially parallel to an axis 10 and are braced against each other by a resilient member 3 made of an elastomeric material. The resilient member 3 defines at least one pair of fluid-filled chambers 5, 6, wherein the chambers are connected by at least one damping opening 8 and are arranged on opposite sides of a plane through the axis 10 so that they diametrically oppose one another.

The chambers 5, 6 are bounded in the axial direction on both sides by end walls, which are each elastically deformable in one partial area 11, 12, 13, 14. Next to each deformable partial area 11, 12, 13, 14, the respective end wall has a rigid zone 15, 16, 17, 18, which is essentially incapable of deformation. At one end of chamber 5, the rigid zone 15 extends to the outer thrust-bearing 1, and at the other end of chamber 5, the rigid zone 16 extends to the inner thrust-bearing 2. Similarly, at one end of chamber 6, the rigid zone 17 extends to the inner thrust-bearing 2, and at the other end of chamber 6, the rigid zone 18 extends to the outer thrust-bearing 1.

The damping action achieved depends significantly on the relative extent of the rigid zones in the radial direction. However, an increasing extent in the radial direction may adversely affect the relative radial mobility of the thrust-bearing parts. Therefore, it is advantageous that the rigid zones of the ends walls of each chamber overlap one another in the radial direction but leave some clearance between themselves and the respective thrust-bearing part. In a preferred embodiment of the present invention, each rigid zone covers between 50 to 75% of the available space between the inner and outer thrust-bearing parts.

In the illustrated embodiment, the end walls of the chambers 5, 6 consist of rubber. Each is an integral part of the resilient member 3 and is connected at its periphery to a metallic end-window tube 9. This end-window tube 9 serves to affix the end walls to the outer thrust-bearing part 1 in an immovable and fluid-tight manner. The thrust-bearing parts 1, 2 in the illustrated embodiment consist of a metallic material.

During normal operational use, the chambers 5, 6 are filled with a hydraulic fluid, for example with a glycol and water mixture. They are in a reciprocal, hydraulic communication with one another through the damping opening 8 which is dimensioned in such a way that when liquid components are pressed through, a damping action results. The damping opening 8 in the illustrated embodiment is surrounded by a separate metallic ring, which is immovably affixed to the inner thrust-bearing part 2. The damping opening is shown in the center of the bearing, but it can also be placed, as needed, at another location.

When vibrations are introduced perpendicularly to the axis 10, the volume of each liquid-filled chamber 5, 6 of the sleeve bearing alternately increases and decreases. Consequently, the pressure in each chamber 5, 6 alternately rises and drops. As a result, liquid components are pressed through the damping opening 8 into the chamber with the lower pressure, thus damping the exciting vibration.

In the case of the illustrated embodiment, damping is also achieved when vibrations are introduced parallel to the axis 10. As with perpendicular vibrations, the volume in each liquid-filled chamber 5, 6 alternately increases and decreases so that liquid components are pressed out of the chamber having a higher pressure into the chamber having a comparatively lower pressure. The resulting damping action corresponds to the one previously described.

In an alternative embodiment, damping may be achieved in more than one direction perpendicular to the axis of the sleeve bearing by providing additional pairs of chambers. The chambers of such a sleeve bearing lap over one another in the circumferential direction. Thus, for example, it is possible to use two pairs of chambers to damp vibrations which are introduced in two axially normal directions which are perpendicular to one another.

It will be appreciated that the above description is set forth for illustration, and the scope of the present invention is not limited to the described embodiments.

What is claimed is:

1. A sleeve bearing comprising an outer thrust-bearing part and an inner thrust-bearing part, wherein the outer thrust-bearing part surrounds the inner thrust-bearing part and wherein the two thrust-bearing parts extend essentially parallel to an axis and are braced against each other by a resilient member made of an elastomeric material, wherein the resilient member defines at least one pair of fluid-filled chambers, wherein the chambers are connected by at least one damping opening and are arranged so that they diametrically oppose one another, wherein each chamber is bounded in an axial direction on each side by an end wall which is elastically deformable in one partial area, wherein each end wall comprises a rigid zone having a stiffness greater than the elastically deformable partial area of the end wall, and wherein on one side of each fluid-filled chamber the rigid zone of the corresponding end wall extends to the outer thrust-bearing part and on the other side of each fluid-filled chamber the rigid zone of the corresponding end wall extends to the inner thrust-bearing part.

2. The sleeve bearing according to claim 1, wherein the rigid zones of the end walls of each chamber overlap one another in the radial direction.

3. The sleeve bearing according to claim 2 wherein the rigid zones are integral parts of the resilient member.

4. The sleeve bearing according to claim 3, wherein the rigid zones surround the damping opening.

5. The sleeve bearing according to claim 4, wherein at least two chamber pairs are provided, whose chambers are arranged around a circumference of the bearing.

6. The sleeve bearing according to claim 3, wherein at least two chamber pairs are provided, whose chambers are arranged around a circumference of the bearing.

7. The sleeve bearing according to claim 2, wherein the rigid zones surround the damping opening.

8. The sleeve bearing according to claim 7, wherein at least two chamber pairs are provided, whose chambers are arranged around a circumference of the bearing.

9. The sleeve bearing according to claim 2, wherein at least two chamber pairs are provided, whose chambers are arranged around a circumference of the bearing.

10. The sleeve bearing according to claim 1 wherein the rigid zones are integral parts of the resilient member.

11. The sleeve bearing according to claim 10, wherein the rigid zones surround the damping opening.

12. The sleeve bearing according to claim 11, wherein at least two chamber pairs are provided, whose chambers are arranged around a circumference of the bearing.

13. The sleeve bearing according to claim 10, wherein at least two chamber pairs are provided, whose chambers are arranged around a circumference of the bearing.

14. The sleeve bearing according to claim 1, wherein the rigid zones surround the damping opening.

15. The sleeve bearing according to claim 14, wherein at least two chamber pairs are provided, whose chambers are arranged around a circumference of the bearing.

16. The sleeve bearing according to claim 1, wherein at least two chamber pairs are provided, whose chambers are arranged around a circumference of the bearing.

* * * * *